UNITED STATES PATENT OFFICE 2,658,815

PREPARATION OF DIBORANE

Edith M. Boldebuck, John R. Elliott, and George F. Roedel, Schenectady, N. Y., assignors to General Electric Company, a corporation of New York No Drawing. Application November 24, 1948, Serial No. 61,902

2 Claims. (Cl. 23—204)

The present invention relates to the preparation of diborane. It is particularly concerned with an improved method of reacting lithium hydride and boron fluoride to obtain good yields of diborane.

The reaction of lithium hydride and boron fluoride in the presence of ethyl ether to yield lithium fluoride and diborane is known. The reaction has generally been believed to be represented by Equation 1.

(1)
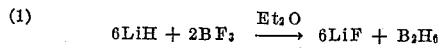
$$6LiH + 2BF_3 \xrightarrow{Et_2O} 6LiF + B_2H_6$$

Heretofore the reaction has been considered unreliable in that the yields of diborane were usually low, ranging generally in the neighborhood of 25% of the theoretical based on the boron fluoride.

It has now been found that due to the conditions under which the materials have generally been brought together, lithium borofluoride is a principal product and the course of the reaction actually follows Equation 2.

(2)
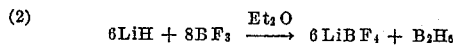
$$6LiH + 8BF_3 \xrightarrow{Et_2O} 6LiBF_4 + B_2H_6$$

Based on the boron fluoride, it will be noted that the second reaction yields 25 percent of the diborane obtainable from Reaction 1. This accounts for the 25 percent yield runs obtained previously when the amounts of the reactants were based on Equation 1. As lithium borofluoride exhibits little or no tendency to react with lithium hydride, for good yields of diborane based on Equation 1, the lithium borofluoride must be caused to take part in the reaction to yield diborane. A primary object of the present invention is to provide a method for effecting reaction between lithium hydride and boron fluoride under conditions such that lithium borofluoride is not a principal final product of the reaction.

The present invention is based on the discovery that the course of reaction between lithium hydride and boron fluoride to produce diborane may be changed from one in which lithium borofluoride is a principal end product to one in which lithium fluoride is a principal product by adding a portion of the boron fluoride to the lithium hydride-ether slurry at 0–10° C., allowing the mixed reactants to warm and surge followed by addition of the remaining boron fluoride. It has been found that when about 15%, preferably about 20% or more, of the theoretical boron fluoride is added to the cold slurry of lithium hydride and the reactants allowed to warm, an exothermic and rapid reaction occurs. During this reaction about 70% of the boron added is evolved as diborane. After the exothermic reaction subsides, the remaining boron fluoride is added at room temperature or above and additional diborane is evolved. Over 80% yields of diborane based on Equation 1 have been consistently obtained.

Experiments have also shown that when less than 10% of the boron fluoride is added cold and the reactants allowed to warm no rapid exothermic reaction is observed and further addition of boron fluoride results in evolution of diborane according to Equation 2 in which lithium borofluoride is a principal end product. When about 10% of the boron fluoride is added under the same conditions, a mildly exothermic reaction occurs and on subsequent addition of boron fluoride some diborane is evolved but the total amount collected is only 50–60% of theory based on Equation 1. As the amount of boron fluoride initially added equals or exceeds 15%, acceptable yields of diborane based on Equation 1 are readily obtained.

The invention will best be understood by reference to the following description of the results of a number of experiments in which different portions of the boron fluoride were added to the lithium hydride slurry are set forth in the following table. In general boron fluoride is most conveniently handled as the etherate and for the purposes of the following experiments, the boron fluoride was used as the etherate.

| Run | Moles LiH | Moles $BF_3 \cdot OEt_2$ Total | Percent Theoretical $BF_3 \cdot OEt_2$ Added at Low Temp. | Percent Yield $B_2H_6$ After Surge | Moles $B_2H_6$ Total | Percent Yield $B_2H_6$ Total |
|---|---|---|---|---|---|---|
| 4 | 3.0 | 1.0 | 100 | 72 | 0.36 | 72 |
| 5 | 6.0 | 2.3 | 38 | 61 | 0.84 | 84 |
| 9 | 6.1 | 2.1 | 21 | 75 | 0.84 | 83 |
| 6 | 6.0 | 2.2 | 11 | 68 | 0.58 | 58 |
| 7b | 6.1 | 2.2 | 10 | 13 | 0.31 | 31 | b No surge occurred on warming.

In this table the yields of diborane are based on the amounts of boron trifluoride etherate used and are calculated from Equation 1. In each of these experiments from 330 to 340 cc. ethyl ether was used for forming the lithium hydride slurry and the first portion of boron fluoride etherate was added to the slurry at a temperature of from 0–10° C. The resultant mixtures were then warmed. At about 21° C., a rapid increase in temperature occurred to the boiling point of ether. Cooling of the mixture with an ice bath was necessary to control the reaction during surging.

From the above table of results, it is seen that over twenty percent etherate added cold catalyzed the subsequent reaction to yield diborane. The addition of less than 10% etherate cold did not result in a surge, the yield was low and typical of the "25 percent" runs referred to hereinbefore. Eleven percent did produce a surge but the final yield was only 58%. In this case diborane evolution paralleled etherate addition according to Equation 1 until about ½ of the etherate had been added; then during the last stage of the addition diborane was evolved at a rate typical of Equation 2 reactions.

For good results, the quantity of boron fluoride initially added may be less than 20% and as low as 15%. In general, from 15 to 50% of the total boron fluoride should be added to the cold slurry before the surge reaction is permitted to take place. Larger proportions may be added at this time. However as higher initial concentrations of the boron fluoride result in increased difficulty in the control of the surge reaction, for practical purposes it is preferred to limit the amount of boron fluoride added to the cold slurry to from 20 to about 35 percent of the total required boron fluoride. In other words, the cold mixture prior to the surge reaction preferably should contain from 0.15 to 0.35 mols boron fluoride for each 3 mols lithium hydride.

What we claim as new and desire to secure by Letters Patent of the United States is:

1. The method of preparing diborane by the reaction of lithium hydride with boron fluoride to obtain yields of diborane in excess of 50% based on the Equation $$6LiH + 2BF_3 \rightarrow 6LiF + B_2H_6$$

which comprises adding to a cold ether slurry of lithium hydride at least 0.15 mol boron fluoride for each three mols of lithium hydride while holding the temperature of the slurry below 10° C., allowing the temperature of the resultant mixture to increase until an exothermic reaction occurs, and after this reaction subsides adding sufficient boron fluoride to bring the total quantity of added boron fluoride to at least one mol per 3 mols lithium hydride.

2. The method of preparing diborane by the reaction of lithium hydride with boron fluoride etherate to obtain yields of diborane in excess of 50% based on the Equation $$6LiH + 2BF_3 \rightarrow 6LiF + B_2H_6$$

which comprises adding to a cold ether slurry of lithium hydride, from 15 to 35 percent of the boron fluoride etherate calculated as necessary for the reaction $$6LiH + 2BF_3 \rightarrow 6LiF + B_2H_6$$

while maintaining the mixture at a temperature of from 0 to 10° C. during and for about one hour after the addition of the boron fluoride etherate, warming the mixture to about 20° C. to effect an exothermic reaction resulting in the formation of diborane, maintaining the mixture below the boiling point of ether during the exothermic reaction, and, after said reaction has subsided adding the remaining boron fluoride etherate.

EDITH M. BOLDEBUCK.
JOHN R. ELLIOTT.
GEORGE F. ROEDEL.

References Cited in the file of this patent
UNITED STATES PATENTS

| Number | Name | Date |
|---|---|---|
| 2,461,661 | Schlesinger et al. | Feb. 15, 1949 |
| 2,544,472 | Schlesinger et al. | Mar. 6, 1951 |